US007873655B2

(12) United States Patent
Chang et al.

(10) Patent No.: US 7,873,655 B2
(45) Date of Patent: Jan. 18, 2011

(54) AUTOMATED MOBILE COMMUNICATIONS

(75) Inventors: Eric Chang, Beijing (CN); Kong-Kat Wong, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 11/624,015

(22) Filed: Jan. 17, 2007

(65) Prior Publication Data

US 2008/0172361 A1 Jul. 17, 2008

(51) Int. Cl.
G06F 17/30 (2006.01)
(52) U.S. Cl. ...................................... 707/770
(58) Field of Classification Search ........................ None
See application file for complete search history.

(56) References Cited

U.S. PATENT DOCUMENTS

| | | | |
|---|---|---|---|
| 6,978,316 | B2 | 12/2005 | Ghaffar |
| 7,065,588 | B2 * | 6/2006 | Konda et al. ................. 709/246 |
| 7,685,204 | B2 * | 3/2010 | Rogers ........................ 707/770 |
| 2002/0069278 | A1 * | 6/2002 | Forslow ...................... 709/225 |
| 2002/0156896 | A1 | 10/2002 | Lin et al. |
| 2004/0064511 | A1 * | 4/2004 | Abdel-Aziz et al. ......... 709/206 |
| 2004/0196866 | A1 * | 10/2004 | Park et al. ................... 370/466 |
| 2004/0199665 | A1 | 10/2004 | Omar et al. |
| 2004/0203923 | A1 * | 10/2004 | Mullen ..................... 455/456.1 |
| 2004/0220998 | A1 | 11/2004 | Shenfield et al. |
| 2005/0005259 | A1 | 1/2005 | Avery et al. |
| 2005/0114895 | A1 | 5/2005 | Ismail et al. |
| 2005/0266835 | A1 | 12/2005 | Agrawal et al. |
| 2006/0003777 | A1 | 1/2006 | Nonoyama et al. |
| 2006/0075230 | A1 * | 4/2006 | Baird et al. ................. 713/168 |
| 2006/0148499 | A1 | 7/2006 | Chie |
| 2006/0155461 | A1 | 7/2006 | Cho |
| 2006/0166686 | A1 | 7/2006 | Kim |
| 2006/0168318 | A1 * | 7/2006 | Twiss .......................... 709/238 |
| 2006/0173959 | A1 | 8/2006 | McKelvie et al. |
| 2007/0016587 | A1 * | 1/2007 | Ranger et al. ................. 707/10 |
| 2007/0271234 | A1 * | 11/2007 | Ravikiran ....................... 707/3 |

(Continued)

OTHER PUBLICATIONS

"A Distributed Search Service for Peer-to-Peer File Sharing in Mobile Applications," by Lindemann and Waldhorst, IN: Proceedings of the Second Int'l Conf. on Peer-to-Peer Computing (2002). Available at IEEE.*

(Continued)

*Primary Examiner*—Neveen Abel Jalil
*Assistant Examiner*—Daniel Kinsaul
(74) *Attorney, Agent, or Firm*—Lyon & Harr, LLP; Mark A. Watson

(57) ABSTRACT

An "Automatic Communicator" provides automated communications services between portable electronic devices (such as, for example, cell phones, PDA's, media players, portable computers, etc.) to facilitate information transfer and matching services while minimizing or eliminating the need for human involvement in responding to queries from one electronic device to another. Such communications are enabled by allowing portable electronic devices ("requesting devices") to send a query to other portable electronic devices ("answering devices"), and have one or more of those answering devices automatically respond to the query without requiring users of the answering devices to become involved in providing that response. In effect, this allows the portable electronic devices of users to act as digital "butlers" or "personal assistants" that respond to queries on behalf of the users of those devices. In various embodiments, privacy concerns are addressed by authenticating authorized requesting devices or limiting information returned in response to queries.

12 Claims, 3 Drawing Sheets

U.S. PATENT DOCUMENTS

2008/0069105 A1* 3/2008 Costa et al. ................. 370/392

OTHER PUBLICATIONS

"A Decentralized Approach to Topology Aware Clustering of Peer-to-Peer Systems," by Wang et al. IN: Int'l Computer Symposium (2004). Available at: http://www.mee.chu.edu.tw/labweb/ICS2004/paper/041.pdf Last Visited: Sep. 7, 2010.*

"Improving Data Access in P2P Systems," by Aberer et al. IN: Internet Computing, IEEE vol. 6, Issue 1 (2002). Available at: IEEE Xplore.*

Ververidis, C.; Valavanis, S.; Vazirgiannis, M.; and Polyzos, G.C. "An Architecture for Sharing, Discovering and Accessing Mobile Data and Services: Location and Mobility Issues." Lobster Workshop, LBS for accelerating the European-wide deployment of Services for the Mobile User and worker, Mykonos, Greece, Oct. 4-5, 2002.

Valavanis E.; Ververidis, C.; Vazirgianis, M.; Polyzos, G.C.; Nørvåg, K., "MobiShare: Sharing Context-Dependent Data and Services from Mobile Sources," Web Intelligence, IEEE / WIC / ACM International Conference on, pp. 263, 2003 IEEE/WIC International Conference on Web Intelligence (WI'03), 2003.

* cited by examiner

AUTOMATED MOBILE COMMUNICATIONS

BACKGROUND

1. Technical Field

The invention is related to automated communications between network enabled mobile devices, and in particular, to a system for automatically validating one or more information requests received by a mobile device and responding with the requested information to one or more authorized requesting devices.

2. Related Art

In general, many portable electronic devices (also referred to herein as "portable computing devices"), such as, for example, cell phones, PDA's, media players, portable computers, etc., include device-to-device communications capabilities across one or more wired or wireless networks (such as a GSM-based cell phone network, for example), the Internet, or direct device-to-device linking via either wired or wireless connections (such as IR or Bluetooth™ based communications, for example). Further, many such devices contain sufficient computing power and storage to run at least basic applications and maintain fairly large amounts of data storage. In fact, many new portable electronic devices, such as some cell phones, for example, now include more computing power, more storage capability, and more memory than the PC-type desktop computers of only ten years ago. Clearly, these portable electronic devices are becoming increasingly powerful in terms of network connectivity, processing power, data storage and messaging capabilities, and it is likely that this trend will continue into the future.

Further, many portable electronic devices now combine the features of many different devices into a single device. A simple example of this type of hybrid device is a typical "cell phone" that includes features which allow the user to capture photographs, play media files, send and receive voice, text, and data messages, determine a present GPS location, run local applications, and to potentially store many gigabytes of data. Increasingly, people use such devices to store and access important information including personal or professional contacts or addresses, electronic calendars or schedules, data files, etc.

In many scenarios, it is important for one person (or device) to be aware of information being stored on (or accessible to) the device of another person. For example, it is often useful for one coworker to know the schedule of a fellow coworker in order to schedule a meeting. While this schedule information may already be stored on, or otherwise available to a portable electronic device (in a "calendar" type application, for example) carried by one person, it will not typically be available to other users or other devices.

Unfortunately, conventional communication patterns involving portable electronic devices (e.g., phone calls, SMS messaging, email, etc.) are designed for one-to-one "push" type communications where devices send data back and forth to each other in response to inputs from their respective users. Another limitation of this type of conventional communication is that that data being exchanged (via voice, SMS, email, etc.) aren't "typed" and thus the communication cannot be easily automated. For example, such back and forth data transfers typically involve a text message or phone call made from a first electronic device to a second electronic device, followed either by a verbal response or manually initiated data transfer directed by the user of the second device back to the first device. Clearly, as the number of users and devices increases, such requests and responses can begin to consume large amounts of the user's valuable time.

Further, the bandwidth necessary to transfer data using such methods can be excessive relative to the actual data desired. For example, if a first user wants to know what times a calendar maintained on the electronic device of a second user shows the second user as free, the actual data needed may be as small as a single line of text information. However, a large amount of bandwidth is needed for the first user to call the second user (e.g., a cell phone call) to ask for the information, then for the second user to send that information to the electronic device of the first user. Clearly, the bandwidth required by this scenario is significantly greater than if the electronic device of the second user could have sent that information to the electronic device of the first user without the phone call having been placed by the first user to the second user. Again, as the number of users and electronic devices increases, such requests and responses can begin to consume large amounts of user's valuable time, and increasing amounts of valuable bandwidth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An "Automatic Communicator," as described herein, provides automated communications services between portable electronic devices (such as, for example, cell phones, PDA's, media players, portable computers, etc.) to facilitate information transfer and matching services while minimizing or eliminating the need for human involvement in responding to queries from one electronic device to another. Note that these portable electronic devices are also referred to herein as "portable computing devices." The following discussion will generally refer to "portable electronic devices." However, various embodiments of the Automatic communicator are also operable on other, non-portable, electronic devices, so long as those electronic devices are capable of engaging in electronic communications with other such devices (such as two-way SMS-capabilities, for example). As such, the Automatic Communicator is not intended to be limited to the use of "portable" electronic devices.

Note that for purposes of explanation, the following discussion will generally refer to electronic devices, portable or otherwise, that are making queries as "requesting devices." Similarly, the following discussion will generally refer to electronic devices, portable or otherwise, that are responding to queries as "answering devices." Further, note that in some cases, a particular electronic device may be both a requesting device and an answering device, as in the case where one portable electronic device forwards one or more received queries on to additional portable electronic devices, as described in further detail herein.

In general, the Automatic Communicator enables automated communications between portable electronic devices by allowing one or more portable electronic devices (requesting devices) to send a query to one or more portable electronic devices (answering devices) of other users, and have one or more of those answering devices automatically respond to the query without requiring users of the answering devices to become involved in providing that response. In effect, this allows the portable electronic devices of users to act as digital "butlers" or "personal assistants" that respond to queries on behalf of the users of those devices. Consequently, one of the clear advantages of the Automatic Communicator is that it preserves the user's valuable time and decreases bandwidth requirements by eliminating the need for users to speak directly regarding particular queries.

In particular, the Automatic Communicator generally operates by providing a local query monitor service or application running on answering devices that receives queries sent from one or more requesting devices via any conventional communications channel (including, for example, SMS messaging, email, P2P communications, etc). The local query monitor service then automatically responds to the received queries with the requested information via any appropriate conventional communications channel. In one embodiment, queries are differentiated from other messages, such as, for example, email messages or other SMS messages, by evaluating a header associated with query messages that informs the local query monitor service that an incoming message is a query.

Further, as noted above, either the requesting device or the answering device can be portable, but is not required to be portable. For example, the same set of communications can be carried out between a portable electronic device and a bank of one or server computers or the like. For example, with a server set up to handle SMS processing, the Automatic Communicator enables a requesting device to query an email server associated with an answering device for particular contact, calendar, other PIM related information, etc.

In view of the above summary, it is clear that the Automatic Communicator described herein provides a unique system and method for providing automated communications services between portable electronic devices. In addition to the just described benefits, other advantages of the Automatic Communicator will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following description of various embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
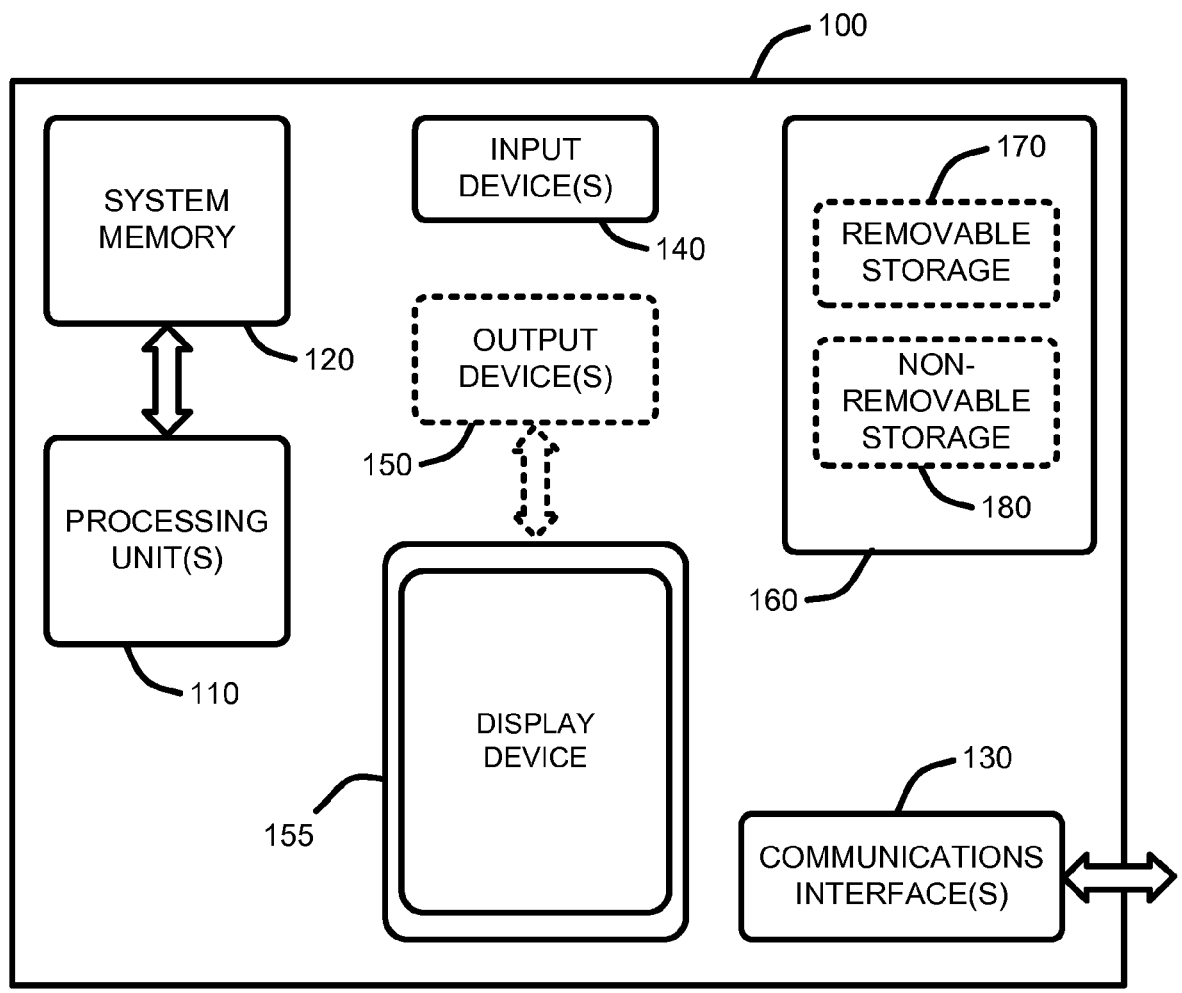
FIG. 1 is a general system diagram depicting a general-purpose computing device constituting an exemplary system for implementing various elements of an Automatic Communicator, as described herein.

1.0 Exemplary Operating Environment:

FIG. 1 illustrates an example of a simplified computing environment on which various embodiments and elements of an "Automatic Communicator," as described herein, may be implemented. It should be noted that any boxes that are represented by broken or dashed lines in FIG. 1 represent alternate embodiments of the simplified computing environment, as described herein, and that any or all of these alternate embodiments, as described below, may be used in combination with other alternate embodiments that are described throughout this document.

At a minimum, to enable a portable electronic device or a portable computing device to implement the "Automatic Communicator" (as described in further detail below), the computing device 100 must have some minimum computational capability and either a wired or wireless communications interface 130 for receiving and/or sending data to/from the computing device using conventional communications channels (such as, for example, GSM-based cell phone networks, the Internet, wired network connections, wireless network connections such as IR, Bluetooth™, WiFi, etc.), and a removable and/or non-removable data storage for locally maintaining data.

In general, FIG. 1 illustrates an exemplary general computing system 100. The computing system 100 is only one example of a suitable computing environment and is not intended to suggest any limitation as to the scope of use or functionality of the invention. Neither should the computing system 100 be interpreted as having any dependency or requirement relating to any one or combination of components illustrated in the exemplary computing system 100.

Note that the following discussion will generally refer to "portable electronic devices." However, various embodiments of the Automatic communicator are also operable on other, non-portable, electronic devices, so long as those electronic devices are capable of engaging in electronic communications with other such devices (such as two-way SMS-capabilities, for example). As such, the Automatic Communicator is not intended to be limited to the use of "portable" electronic devices. In fact, the invention is operational with numerous other general purpose or special purpose computing system environments or configurations, portable or otherwise. Examples of well known computing systems, environments, and/or configurations that may be suitable for use with the invention include, but are not limited to, personal computers, server computers, hand-held, laptop or mobile computer or communications devices such as cell phones, PDA's, pocket PC's or media players, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer or a computing device in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

For example, with reference to FIG. 1, an exemplary system for implementing the invention includes a general-purpose computing device in the form of computing system 100. Components of the computing system 100 may include, but are not limited to, one or more processing units 110, a system memory 120, one or more communications interfaces 130, one or more input and/or output devices, 140 and 150, respectively, and data storage 160 that is removable and/or non-removable, 170 and 180, respectively.

The communications interface 130 is generally used for connecting the computing device 100 to other devices via any conventional interface or bus structures, such as, for example, a parallel port, a game port, a universal serial bus (USB), an IEEE 1394 interface, a Bluetooth™ wireless interface, an IEEE 802.11 wireless interface, GSM cell phone network, etc. Such interfaces 130 are generally used to transfer information, data, or program modules to or from the computing device 100.

The input devices 140 generally include devices such as a keyboard and pointing device, commonly referred to as a mouse, trackball, or touch pad. Such input devices may also include other devices such as a joystick, game pad, satellite dish, scanner, GPS receiver, radio receiver, and a television or broadcast video receiver, or the like. Conventional output devices 150 include elements such as a computer monitors or other display devices, audio output devices, etc. Other input 140 and output 150 devices may include speech or audio input devices, such as a microphone or a microphone array, loudspeakers or other sound output device, etc.

The data storage 160 of computing device 100 typically includes a variety of computer readable storage media. Computer readable storage media can be any available media that can be accessed by computing device 100 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, hard disk drives, or other magnetic storage devices. Computer storage media also includes any other medium or communications media which can be used to store, transfer, or execute the desired information or program modules, and which can be accessed by the computing device 100. Communication media typically embodies computer readable instructions, data structures, program modules or other data provided via any conventional information delivery media or system.

The computing device 100 may also operate in a networked environment using logical connections to one or more remote computers, including, for example, a personal computer, a server, a router, a network PC, a peer device, or other common network node, and typically includes many or all of the elements described above relative to the computing device 100.

The exemplary operating environments having now been discussed, the remaining part of this description will be devoted to a discussion of the program modules and processes embodying the "Automatic Communicator."

2.0 Introduction:

In general, an "Automatic Communicator," as described herein, provides automated communications services between portable electronic devices (such as, for example, cell phones, PDA's, media players, portable computers, etc.) to facilitate information transfer, data requests, matchmaking services, etc., while minimizing or eliminating the need for human involvement in responding to queries from one portable electronic device to another.

Note that for purposes of explanation, the following discussion will generally refer to portable electronic devices that are making queries as "requesting devices." Similarly, the following discussion will generally refer to portable electronic devices that are responding to queries as "answering devices." Further, it should be noted that in some cases, a particular portable electronic device may be both a requesting device and an answering device, as in the case where one portable electronic device forwards one or more received queries on to additional portable electronic devices, as described in further detail herein. In addition, given the computational ability of portable computing devices such as those noted above, these devices are also referred to herein as Note that these portable electronic devices are also referred to herein as "portable computing devices."

2.1 System Overview:

As noted above, the Automatic Communicator described herein provides a system and method for enabling automated communications between portable electronic devices by allowing one or more portable electronic devices (requesting devices) to send a query to one or more portable electronic devices (answering devices) of other users, and have one or more of those answering devices automatically respond to the query without requiring users of the answering devices to become involved in providing that response. In effect, this allows the portable electronic devices of users to act as digital "butlers" or "personal assistants" that respond to queries on behalf of the users of those devices. Consequently, one of the clear advantages of the Automatic Communicator is that it preserves the user's valuable time and decreases bandwidth requirements by eliminating the need for users to speak directly regarding particular queries.

In particular, the Automatic Communicator generally operates by providing a local query monitor service or application running on answering devices that receives queries sent from one or more requesting devices via any conventional communications channel (including, for example, SMS messaging, email, P2P communications, etc). The local query monitor service then automatically responds to the received queries with the requested information via any appropriate conventional communications channel. In one embodiment, queries are differentiated from other messages, such as, for example, conventional email messages or other SMS messages, by evaluating a header associated with query messages that informs the local query monitor service that an incoming message is a query.

Further, it should be clear the aforementioned query/response capabilities allow the Automatic Communicator to act as a matchmaker for providing social networking-type services. For example, if the user of one requesting device has a set of one or more interests, the requesting device can send all or part of that set of interests to one or more answering devices (who may also then forward that list to additional answering devices). One or more of the answering devices may then respond to the original requesting device with an indication that the users of those devices hold one or more common interests with the user of the original requesting device.

In still further embodiments, if an answering device has location-determination capabilities (such as GPS, for example), that answering device can report its current position in response to a current location query sent from a requesting device. In various related embodiments, device location is determined by using combinations of one or more existing positioning technologies to approximately deduce the location of one or more user devices. In this case, current location is periodically reported to the answering device from one or more remote servers.

Conventional positioning technology leveraged by the Automatic Communicator includes techniques such as GPS (or other satellite navigation), cell phone triangulation, WiFi mapping, RFID tracking, etc. Note that these types of conventional positioning or location identification technologies are well understood by those skilled in the art, and will not be described in detail herein. Clearly, any desired type of positioning or location identification technology can be used by the Automatic Communicator, including manual user input for specifying a current location, and as such, the Automatic Communicator is not intended to be limited to the use of the exemplary positioning or location identification technologies referenced herein.

Clearly, security and privacy issues may limit the information that particular users wish to share with other users or devices. Consequently, in various embodiments, the Automatic Communicator validates queries and/or the source of those queries, prior to responding to those query requests. Note that authentication/validation of query requests is discussed in further detail below in Section 3.4.

Figure 2:
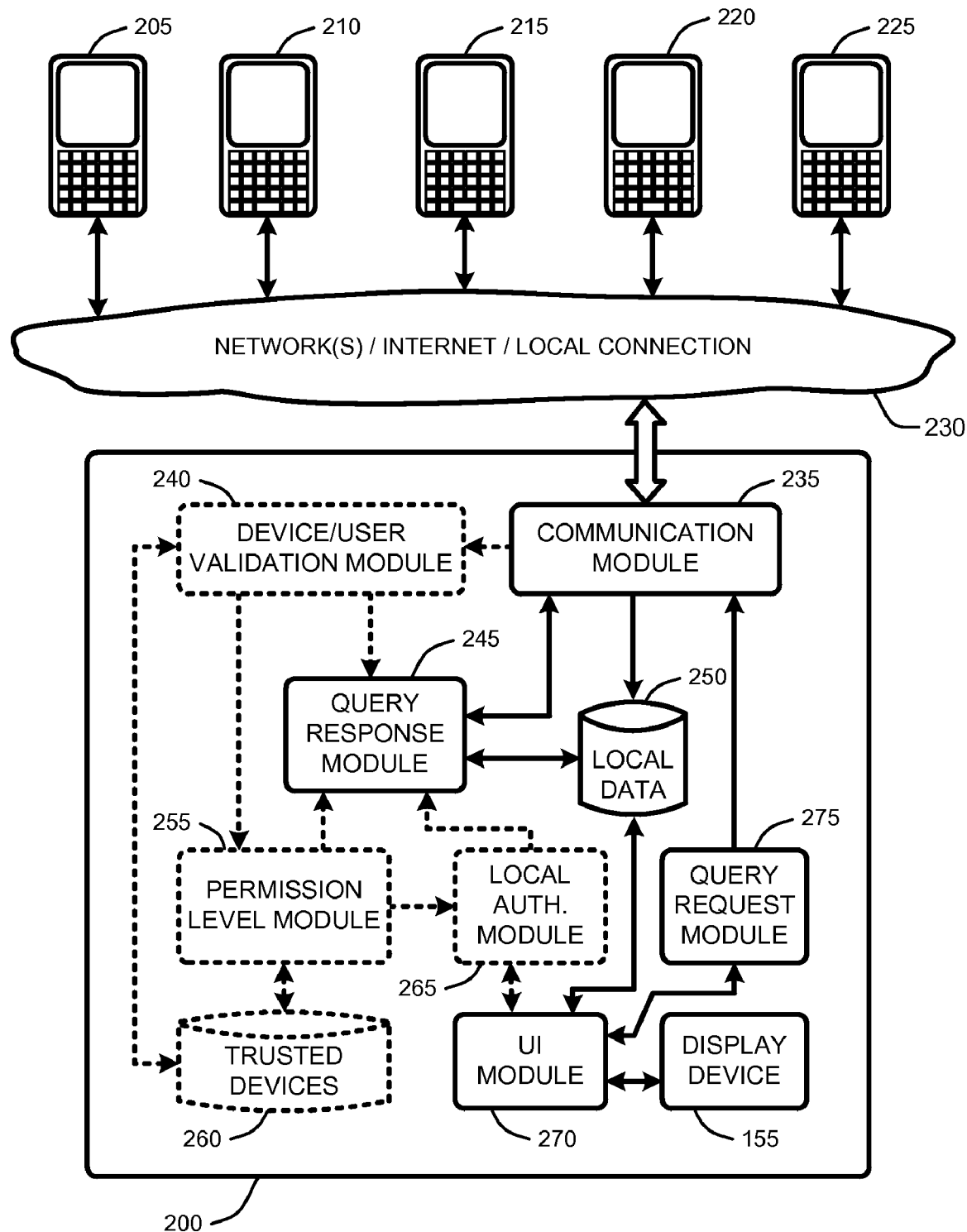
FIG. 2 illustrates an exemplary architectural system diagram showing exemplary program modules and communications systems for implementing various embodiments of the Automatic Communicator, as described herein.

2.2 System Operational Overview:

The processes summarized above are further illustrated by the general system diagram of FIG. 2. In particular, the system diagram of FIG. 2 illustrates the interrelationships between program modules for implementing the Automatic Communicator, as described herein. It should be noted that any boxes and interconnections between boxes that are represented by broken or dashed lines in FIG. 2 represent alternate embodiments of the Automatic Communicator described herein, and that any or all of these alternate embodiments, as described below, may be used in combination with other alternate embodiments that are described throughout this document.

In general, as illustrated by FIG. 2, the Automatic Communicator generally operates on portable electronic devices, such as devices 200, 205, 210, 215, 220, and 225. Note that devices 200, 205, 210, 215, 220, and 225 may all be different electronic devices (cell phones, PDAs, media players, etc.) that include sufficient computing, storage and communications capabilities to implement the capabilities of the Automatic Communicator described herein. Further, device 200 generally illustrates the various program modules (some of which are optional) that are included in any of the other devices 205, 210, 215, 220, and 225. However, for purposes of simplifying FIG. 2 for readability and understanding, rather than repeat these program modules with respect to every device 200, 205, 210, 215, 220, and 225, they are only illustrated with respect to portable device 200.

Further, for purposes of explanation, portable electronic device 200 will generally be described in terms of an answering device, while portable electronic devices 205, 210, 215, 220, and 225 will be generally described in terms of requesting devices. However, as described herein, it should be understood that any or all of these devices 200, 205, 210, 215, 220, and 225 can act as either or both requesting devices and answering devices.

The Automatic Communicator begins operation on answering device 200 by receiving a query request transmitted across a conventional communications channel 230 from a requesting device 205, 210, 215, 220, and/or 225. This query request is received by a communications module 235. The communication module then forwards the query request to a query response module 245. The query response module 245 then checks a local (or remotely accessible) data store 250 to determine whether the information requested by the query response is locally available or locally accessible (such as, for example, via a query made by the answering device to a remote server). If the information is locally available or otherwise locally accessible, the query response module 245 retrieves that information from the local data store 250 and returns it to the communication module 235 which in turn transmits that response to the requesting device or devices 205, 210, 215, 220, and/or 225.

Note that when acting as a requesting device, device 200, 205, 210, 215, 220, and/or 225 will generate the query request via a query request module 275 which is transmitted to one or more answering devices 200, 205, 210, 215, 220, and/or 225 via the local communication module 235 of the requesting device. In various embodiments, as described in further detail below in Section 3, query requests can be automatically generated by the query request module 275 (such as in the case where a query request received by one device is forwarded to another device), or can be manually entered by the user via a user interface module 270 using conventional data entry techniques in combination with a display device 155 for displaying, entering, and/or selecting the query request to be submitted.

Furthermore, it should also be noted that query requests can be sent to multiple devices (200, 205, 210, 215, 220, and 225). For example, if the user associated with device 200 wants to know the current location of the users associated with devices 205, 210, 215, 220, and 225, device 200 can be directed to send a blanket query to everyone in a group of peers or contacts that are associated with devices 205, 210, 215, 220, and 225.

Clearly, electronic devices such as cell phones or PDA's, for example, may receive many messages such as email, text messages, etc., that are not intended to be query requests. Consequently, in one embodiment, the communication module 225 first evaluates incoming messages to determine whether they are actually queries before sending those queries to the query response module 245. Any message not intended as a query request is simply ignored by the communication module 235 and processed by whatever messaging processing applications are resident on the receiving device. In other words, in the case where the Automatic Communicator is intended to operate in cooperation with other messaging technologies already resident on the portable electronic device 200, 205, 210, 215, 220, and 225, the communications module will intercept incoming messages and only act on those messages that are actually query requests.

Consequently, in order to facilitate the determination by the communication module 235 as to whether an incoming message represents a query request, in one embodiment, a header or other unique message identifier is included with query requests to alert the communication module that the current message is indeed a query request. The remaining body of the query request will then include whatever additional parameters are necessary for the query response module to determine the extents of the query request and to respond appropriately.

Further, as noted above, security and privacy issues may limit the information that particular users wish to share with other users or devices. Consequently, in various embodiments, the Automatic Communicator validates query requests before acting on those query requests.

For example, in one embodiment, a device/user validation module 240 acts to determine the validity of incoming query requests before allowing the query response module 245 to answer those query requests. The device/user validation module 240 uses conventional validation techniques (such as, for example, public/private key technologies, passwords, unique user ID's, etc.) to determine whether a particular query request has been transmitted from a trusted user or a trusted device. In one embodiment, this is implemented by checking the source of the query request message against a local database of trusted devices 260 or trusted users.

In a related embodiment, various users or devices (200, 205, 210, 215, 220, and 225) can be assigned varying levels of access to different types of information. For example, a particular user or the associated device (205, 210, 215, 220, and/or 225) may be allowed to access the business telephone numbers of anyone in an address book maintained in the local data store 250. However, this same user may not be allowed to access home telephone numbers for one or more of the people in the address book maintained in the local data store 250. In this case, a query request by a device (205, 210, 215, 220, and/or 225) for a home telephone number will be: 1) ignored by the answering device 200; answered by the answering device 200 with a refusal to provide the requested information; or 3) forwarded to the display device 155 of the answering device 200 for manual user authorization or permission via a local authorization module 265. In this last case, the user of the answering device 200 either manually allows the query request or manually denies the query request via the user interface module 270. Allowed requests are then processed via the query response module 245 in the manner described above.

Finally, in yet another embodiment, in the case where the query response module 245 determines that the query request can't be answered from the local data store, the answering device 200 will forward the query request to one or more other devices (205, 210, 215, 220, and/or 225) other than the original requesting device. One or more of these other devices (205, 210, 215, 220, and/or 225) will then act as an answering device with respect to the original requesting device.

In general, this type of forwarded query request can be passed to any of the "peers" known to the answering device that is unable to answer the query request. As such, particular queries can be forwarded to multiple levels of peers, such as when the devices in a second level of devices receiving the forwarded query request are also unable to answer the query request. In this case, the level of recursion involved can be limited, if desired, to some predetermined number of request levels so that a query request is not forwarded forever to peers that are more and more remote from the original requestor. This forwarding recursion level can be set as a flag in the original query request, or can be predefined as a variable in the overall Automatic Communicator system.

In addition, the Automatic Communicator enables device position reporting (in response to a query request) by using conventional tracking technologies to determine the approximate position of the answering device (200, 205, 210, 215, 220, and/or 225). As noted above, conventional tracking technologies used to approximately locate user devices 200 include technologies such as, for example, GPS or other satellite-based navigation, WiFi-based location identification, RFID-based location identification, wireless base-station signal tracking for location identification, cell tower-based cell phone signal location identification, etc. Such location identification technologies are well known to those skilled in the art, and will not be described in detail herein.

3.0 Operational Details of the Automatic Communicator:

The above-described program modules are employed for implementing the Automatic Communicator described herein. As summarized above, this Automatic Communicator provides a system and method for enabling automated communications between portable electronic devices. The following sections provide a detailed discussion of the operation of the Automatic Communicator, and of exemplary methods for implementing the program modules described in Section 2. In particular, the following paragraphs describe inter-device communications; local query monitor service/application; query requests; authorization considerations; determination of device position for location queries; and examples of automated communication scenarios enabled by the Automatic Communicator.

3.2 Inter-Device Communications:

In general, the Automatic Communicator leverages existing communications technologies in order to adapt existing portable electronic devices for enabling automated communications between those devices. In other words, the Automatic Communicator allows portable electronic devices to communicate with each other using whatever services or communications are already enabled for those devices using conventional wired or wireless communications channels (GSM, GPRS, WiFi, TCP/IP, IR, Bluetooth™, etc.). These types of communications are well known to those skilled in the art and will not be described in detail herein.

3.3 Query Monitor Service:

Since portable electronic devices routinely communicate across various services and channels using various message formats (email, SMS, P2P communications, etc.), it is only necessary for the Automatic Communicator to differentiate incoming messages that represent query requests from other incoming messages. This differentiation can be done in one of two ways. First, the Automatic Communicator can examine the contents of every incoming message to determine whether it is a query request, or second, query request messages can be uniquely identified with a header, flag, or other identifier that informs the Automatic Communicator that a particular message is a query request without the need to examine the entire contents of the message.

In either case, the Automatic Communicator includes a query monitor service or the like that runs as a local application on the portable electronic device to determine whether incoming messages represent query requests or not. In particular, as noted above, the local query monitor service or application running on an "answering device" intercepts messages sent from other devices via any conventional communications channel. The local query monitor service then determines whether the incoming message is a query request either by evaluating the entire message to determine whether a query request is embedded in that message, or by locating a query request identifier within the message.

Messages that are not query requests are ignored by the Automatic Communicator, and may then be processed by whatever other messaging application is running on the local device (either separately or in cooperation with the Automatic Communicator). Messages that are query requests are further processed by the Automatic Communicator to determine the scope of the query request and whether the answering device is authorized and/or capable of responding to the query request.

3.3 Query Requests:

In general, query requests must accomplish at least two things. First the query request must inform the answering device that information is required by a requesting device, and second, the query request must include sufficient parameters or information to allow the Automatic Communicator to fully respond to the query request. The content of the query request message can prepared in any desired format (plain text, XML, HTML, etc.). Further, to address some privacy concerns the query request message can be encrypted using conventional encryption technologies (password based hash, public/private keys, etc.). Note that such privacy concerns are discussed in further detail in Section 3.4.

For example, in one embodiment, the Automatic Communicator uses an XML-based message format for query requests. Each XML message contains two parts: 1) a "header" that identifies the message as a query and specifies a "service" to be initiated for responding to the query request; and 2) a set of "parameters" that are needed by the answering device to perform the requested service.

The concept of different "services" is used by the Automatic Communicator in order to provide the capability to quickly respond to different types in information requests in the query request. For example, if the query request requires information retrieval from a local address book, the Automatic Communicator will need to perform different actions than if the query request requires a current location of the answering device. As such, the parameters included in the query message will include whatever information is needed by the answering device in order to fully respond to the query request.

For example, if a query request asking for device locations is broadcast to a set or group of answering devices, one of the "parameters" included in that request may be that a response is desired only from those answering devices that are within some specified radius of a position reported by the requesting device as one of the "parameters." Clearly, the parameters included in a query request can serve to limit the scope of the request or identify the type of information required. Further, these parameters will also allow the answering device to determine whether the particular type of query request being made is even supported by the answering device.

For example, in the case where the answering device has no capability to report a current location, the Automatic Communicator will evaluate the parameters of the request, determine that the request is not supported, then either ignore the request, inform the requesting device that the request is not supported, or prompt the user of the answering device to manually enter a location, if desired, for replying to the requesting device.

Similarly, if the answering device does not maintain a local address book, or if the address book is not populated, query requests including parameters asking for contact information for particular users can not be automatically answered. In this case, the Automatic Communicator will evaluate the parameters of the request, determine that the request is not supported, and then either ignore the request, inform the requesting device that the request is not supported, or prompt the user of the answering device to manually enter the requested contact information, if desired, for replying to the requesting device.

In other words, the Automatic Communicator intercepts all incoming messages. The Automatic Communicator then checks each message to determine whether it is a query request. If the message is a query request, the Automatic Communicator then evaluates the parameters of the message to determine whether the requested service is supported by the answering device. If the service being requested is supported, then the Automatic Communicator passes the parameters of the query request to an event handler that processed the query request and returns the result back to the original sender (i.e., the requesting device). The return response is either in the form of a message that includes the requested information, or in the form of another query request that will be handled by the local instantiation of the Automatic Communicator that is resident on the requesting device.

For example, in the case where the original requesting device sends a query request asking for available meeting times of a user relative to a local user calendar maintained on the answering device, the answering device can respond with one or more meeting times that do not conflict with the local user calendar maintained on the answering device. In this case, the requesting device will then process the incoming meeting times as a query request, compare those times to available time maintained in a local user calendar maintained on that requesting device, then either automatically select an available time or pass the choices on to the user for manual user selection. Once a meeting has then been selected, the requesting device will then send another query request back to the answering device with a request to confirm the selected meeting time.

Note that additional examples of query requests, and of general communications scenarios enabled by the Automatic Communicator, are discussed below in Section 3.6.

3.4 Authorization and Privacy Considerations:

In order to enable user or device authentication, various embodiments of the Automatic Communicator allow the user to create and/or maintain a local list of peers, users or specific devices that are authorized to access either some or all of the data held by a user. This list of authorized users and/or devices can be maintained as a data field in an existing address book or contact list, or can be maintained as a separate database.

As noted above, security and privacy issues may limit the information that particular users wish to share with other users or devices. Consequently, in various embodiments, the Automatic Communicator validates queries from requesting devices to ensure: 1) that the query is being received from a valid or authorized requesting device (or associated user); 2) that the query is for information that is authorized to be automatically sent in response to the query; and/or 3) that the received query is authorized to be forwarded to one or more other portable electronic devices if the present answering device is unable to fully answer the query.

Furthermore, in the case where authorization may be required before an answering device responds to the query request of a requesting device, the query request must also include information that indicates the source of the query request as coming from either a particular device or group of devices, or as being associated with a particular user or user group. In one embodiment, this information is included in the header of the query request message. However, information as to the source of the query request can be included anywhere within the query request.

Note that in the event that a query is forwarded by one answering device to another answering device, the ultimate response to the query can be provided either directly to the original requesting device from whatever answering device can fully respond to the query, or via the same chain by which the original query reached the final answering device.

In related embodiments, answering devices will maintain a list of specific authorization levels that are assigned to one or more particular requesting devices (or the associated users) or for particular types or specific elements of information. As such, query responses can be either automatic, or can require local user approval prior to responding to a query, depending upon the authorization level for a particular requesting device (or associated user) or for the particular data being requested by a particular requesting device.

3.5 Device Position for Location Queries:

As noted above, one type of query request involves asking one or more answering devices to respond with a present location. As is well known to those skilled in the art, the approximate location of portable electronic devices can often be determined by using combinations of one or more existing positioning technologies to approximately deduce the location of those devices. Conventional positioning technology leveraged by the Automatic Communicator includes techniques such as GPS (or other satellite navigation), cell phone triangulation, WiFi mapping, RFID tracking, etc.

In general, any conventional positioning or location identification technology can be used by the Automatic Communicator. However, in one embodiment, the Automatic Communicator operates in a hierarchical manner to use the most accurate positioning technique available when there is a choice of two or more available techniques for a particular device or user. For example, when a GPS enabled cell phone is capable of self-reporting a GPS location, the GPS location would tend to be more accurate than cell signal tracking via nearby cell towers that is reported back to that cell phone by a remote tracking service.

Further, in a related embodiment, when multiple signal/tracking techniques or services are available for a particular user device (such as, for example, GPS, WiFi tracking, RFID readers, cell signals triangulation, mappings between the corresponding user device locations and the relative strengths are jointly mapped so that an approximate user device location can be deduced when some lesser set of those signal types are available. For example, when a user is outdoors with a GPS enabled cell phone, the location of the user can be accurately identified via a GPS receiver in the phone. However, if the user then steps into an adjacent structure, the GPS signal may be blocked while the cell signal is approximately the same. As a result, the original mapping between the cell signal and the known GPS location can be used to deduce a current user location to a higher accuracy than the use of cell signal tracking alone. Clearly, there are many such combinations of signal types and location information that can aid in deducing approximate user positions.

Note that conventional positioning or location identification technologies such as those described above are well understood by those skilled in the art, and will not be described in detail herein. Clearly, any desired type of positioning or location identification technology can be used by the Automatic Communicator, including manual user input for specifying a current location, and as such, the Automatic Communicator is not intended to be limited to the use of the exemplary positioning or location identification technologies referenced herein.

3.6 Examples of Automated Communication Scenarios:

In general, the Automatic Communicator Butler addresses mobile communication patterns among team members, networked business partners, or groups of users or peers by providing automated communications between portable electronic devices, as discussed above.

For example, one common scenario enabled by the Automatic Communicator is a user who has information such as, for example, a prospective customer contact, a project status, current location, her own schedule, etc., stored on her communications enabled PDA. In this case, the user may not want, or need, to compose and send individual messages to all members in her team or business network, she may only want to make her information available when, and if, her teammates need it. In this scenario, any of her peers wanting to know her status with respect to a client meeting, information of prospective customer contacts, her schedule for a specific date, etc., will use the Automatic Communicator to send a query request to her PDA. Her PDA will then process that query request, and respond with the requested information, as described above, without the need to ever bother the user with any of the requests sent to her PDA.

Note that this type of scenario also helps to aggregate business information that is currently available to individual team members, but distributed across the team members' devices, by making all of the information accessible by the team as a whole. For example, with by using the Automatic Communicator, user A now has access to the business contacts available from user B's mobile device (subject to user B's consent or authorization to share the information with user A, as described above).

Another common scenario enabled by the Automatic Communicator is for team members to effectively execute simple business workflows on the road. For example, one user might need information from her team member to provide some information (inventory, price quotes, schedule, etc.) so that she may respond to a potential customer in a timely fashion. In such scenarios, users use the Automatic Communicator to carry out simple but urgent business workflows by simply broadcasting one or more query requests to the portable electronic devices of one or more other members of their team. In other words, various implementations of the Automatic Communicator enables device to device data communication so that business information can be shared or exchanged for enabling various business scenarios.

Additional communications scenarios enabled by the Automatic Communicator include "social" scenarios that allows automatic matching between people that: 1) have chosen to reveal their current location and/or interests as public; 2) have identified one another as peers/friends; or 3) have otherwise indicated allowable sharing of a common set of metadata (e.g., specific interests, gender, age range, etc.) and have chosen to be automatically matched by the Automatic Communicator. In this case, the Automatic Communicator will send corresponding query requests to contacts in the address book of the requesting device, or, depending upon the communications channels available to that device, may broadcast query requests to one or more anonymous answering devices (such as nearby WiFi or Bluetooth™ enabled devices, for example).

3.6.1 Tested Embodiments of Automated Communications Scenarios:

The following paragraphs describe additional simple examples of specific communications scenarios that have been enabled in a tested embodiment of the Automatic Communicator.

3.6.2 Contact-Type Query Requests:

In a tested embodiment of the Automatic Communicator, peers/users were provided with the capability to automatically share contact information with each other. Further, query requests for contact information can be sent to one or more peers in much the same way that an email message is addressed to one or more recipients without having to send the email message more than once.

In particular, in this embodiment, users (representing members of a predefined set of authorized peers) were provided with the capability to send query requests to each other from their PDAs (or other portable electronic devices) to request contact information for one or more business contacts. In this embodiment, query requests for business contacts are either generic (such as, for example, "send all contacts") or are delimited in some way (such as, for example, "send new contacts added today" or "send all contacts beginning with "B""). In this embodiment, replies to the query requests were either sent back to the requesting device automatically, or sent upon specific user approval by the user/owner of the answering device.

Further, in a related embodiment, users of answering devices are provided with the capability to review responses to query requests before those responses are returned to the requesting device. Consequently, in this embodiment, the user of the answering device is provided with the capability to edit and/or remove one or more contacts that the user does not want to share with the requesting device. Once edited, the response is sent to the requesting device using conventional communications channels, as described above.

3.6.3 Schedule-Type Query Requests:

In a tested embodiment of the Automatic Communicator, peers/users were provided with the capability to automatically share and coordinate schedule information with each other. Further, query requests for schedule information can be sent to one or more peers in much the same way that an email message is addressed to one or more recipients without having to send the email message more than once.

In particular, in this embodiment, users (representing members of a predefined set of authorized peers) were provided with the capability to send query requests to each other from their PDAs (or other portable electronic devices) to request (or send) schedule information to fellow peers to share their schedules with one another. In this embodiment, the Automatic Communicator allowed users to either push their own schedules in a query request to one or more of their peers, or to retrieve the schedules of those peers via a query request for those schedules.

As with other information, in one embodiment, schedule results can be approved and/or edited by the user/owner of the answering device prior to sending that information to the requesting device. Further, query requests for schedules can be made for an entire schedule, or any subset or period of time covered by that schedule by simply delimiting the request in the parameters of the query request being sent to one or more of the answering devices.

3.6.3 Location-Type Query Requests:

In a tested embodiment of the Automatic Communicator, peers/users were provided with the capability to automatically share and coordinate location information with each other. Further, query requests for location information can be sent to one or more peers in much the same way that an email message is addressed to one or more recipients without having to send the email message more than once.

In particular, in this embodiment, users (representing members of a predefined set of authorized peers) were provided with the capability to send query requests to each other from their PDAs (or other portable electronic devices) to request (or send) current geographic locations to each other. For example, in one embodiment, the Automatic Communicator allow users to locate one or more peers wherever they are, or to locate one or more peers that are within a user configurable or selectable distance from the present location of the requesting device. Note that this second embodiment requires that both the requesting device and all answering devices are capable of: 1) determining their own locations (GPS, etc.); 2) receive a report on their own location from a remote location service (such as, for example, cell-tower based signal triangulation based tracking); or 3) allow individual users to manually enter a current location into their device.

3.6.3 Status-Type Query Requests:

In a tested embodiment of the Automatic Communicator, peers/users were provided with the capability to automatically share and request status information with each other. Further, query requests for status information can be sent to one or more peers in much the same way that an email message is addressed to one or more recipients without having to send the email message more than once.

In particular, in this embodiment, users (representing members of a predefined set of authorized peers) were provided with the capability to send query requests to each other from their PDAs (or other portable electronic devices) to request (or send) current status (e.g., "busy," "in town," "on travel," "sick," "at lunch," etc.) to each other. Clearly, current status of a user can be described by a single word (e.g., "busy"), or can be described in as much detail as a user cares to enter into his portable electronic device. Further, in a related embodiment, a menu of possible status choices are provided to users so that a user can quickly update his present status by simply selecting from the list of predefined status conditions. So long as a user updates his or her device with a present status (either manually or via menu selection), then any time another user sends a status query request to that user's device, the device will respond as an answering device and report the current status of that user to any authorized requesting devices.

Clearly, the simple examples of automated communication scenarios described above are not intended to limit the scope of the services enabled by the Automatic Communicator. In fact, such examples are provided simply for purposes of explanation in describing some of the basic capabilities of the Automatic Communicator.

Figure 3:
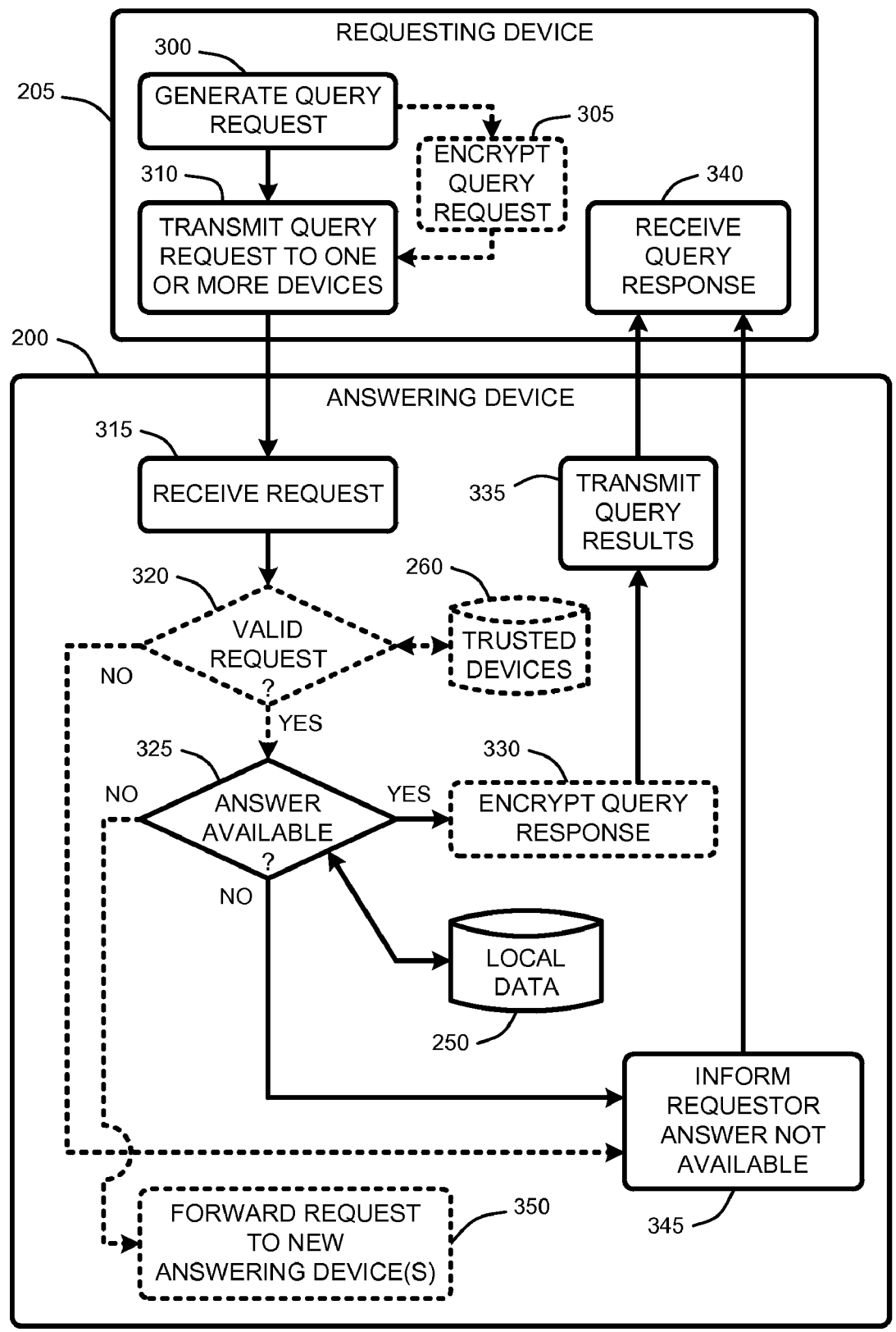
FIG. 3 illustrates an exemplary system flow diagram for automating communications between two or more portable electronic devices for implementing various embodiments of the Automatic Communicator, as described herein.

4.0 Automatic Communicator Operational Overview:

The processes described above with respect to FIG. 2, and in view of the detailed description provided in Sections 2 and 3 are generally summarized by the operational flow diagram of FIG. 3. In particular, FIG. 3 illustrates an exemplary operational flow diagram which illustrates an overview of the operation of various embodiments of the Automatic Communicator. It should be noted that any boxes and interconnections between boxes that are represented by broken or dashed lines in FIG. 3 represent alternate embodiments of the Automatic Communicator described herein, and that any or all of these alternate embodiments, as described below, may be used in combination with other alternate embodiments that are described throughout this document.

In general, as illustrated by FIG. 3, operation of the overall Automatic Communicator system begins by using a requesting device 205 to generate 300 a query request. That query request is then optionally encrypted 305. Whether or not the query request has been encrypted 305, the requesting device 205 then transmits 310 the query request to one or more answering devices 200.

Once the answering device 200 receives 315 the query request, the answering device optionally determines whether the request is valid 320. As discussed above, determination of request validity 320 can be accomplished in a number of ways, such as, for example, by checking the source of the query message against a database 260 of trusted devices or trusted users.

If a validity test 320 is performed, the answering device will either ignore query request messages that are not valid, or will inform 345 the requesting device 205 that an answer is either not available or will not be provided in response to the request. On the other hand, if the validity test 320 indicates that the query request is valid, or if no validity test is performed, then the answering device will examine the parameters of the query request and determine whether it can answer 325 the query request by checking a database 250 of locally available or accessible information.

If no answer 325 can be provided, one of two things happen. First, in one embodiment, the answering device 200 informs 345 the requesting device 205 that an answer is either not available or can't be provided. Alternately, if no answer 325 can be provided, the answering device 200 will forward 350 the request to one or more other potential answering devices. At this point, the process described above beginning at the step described with respect to Box 315 of FIG. 3 repeats (with the new answering device) in attempt to answer the original query request.

On the other hand, if an answer 325 can be provided to the query request, the answering device 200 will optionally encrypt 330 the reply to the query response and, whether or not it has been encrypted, the answering device will then transmit 335 the query results to be received 340 by the requesting device 340.

Finally, in the case where a new answering device is attempting to answer the query request following forwarding 350 of that request to the new answering device by the original answering device 200, if the new answering device can answer the query request, it will either respond directly to the original requesting device 205, or will respond to the original answering device 200 which will in turn then respond to the original requesting device 205.

The foregoing description of the Automatic Communicator has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Automatic Communicator. It is intended that the scope of the invention be limited not by this detailed description, but rather by the claims appended hereto.

What is claimed is:

1. A system for automating communications between two or more computing devices, comprising:

generating a query request message comprising a request for information on a first computing device;

wherein the query request message specifies a forwarding recursion level, said forwarding recursion level providing a maximum number of peer levels to which the query request message may be forwarded if that query request message is unanswerable by any computing device receiving the query request message;

transmitting the query request message from the first computing device to at least one additional computing device comprising a first peer level;

on any computing device that receives the transmitted query request message;

automatically evaluating the query request message to determine whether the additional computing device can respond to the query request message from locally accessible data, automatically preparing a query response message including the information requested by the query request message if that information is locally accessible, and automatically transmitting the query response message to the first computing device, automatically forwarding the query request message to one or more further computing devices comprising a subsequent peer level when the information requested by the query request message is not locally accessible, and wherein further computing devices in subsequent peer levels will continue to forward the query request message to one or more further computing devices comprising further subsequent peer levels when the information requested by the query request message is not locally accessible until such time as the recursion level representing the maximum number of peer levels has been reached;

on the first computing device, automatically receiving the query response messages transmitted from any computing device;

using one or more of the additional computing devices to send at least one reply information request to any of the first computing device and the other additional computing devices in response to the query request message; and wherein any of the first computing device and the other additional computing devices receiving one or more reply information requests responds to the reply information requests by transmitting any corresponding locally accessible information to the computing device that sent the reply information request.

2. The system of claim 1 wherein any of the query request message and the query response message are encrypted prior to transmitting the message.

3. The system of claim 1 wherein each additional computing device validates received query request messages as being authorized prior to preparing the query response message including the information requested by the query request message, and wherein the additional computing device will not prepare and transmit the query response message in reply to any invalid query request message.

4. The system of claim 1 wherein each further computing device automatically transmits the query response message to the additional computing device that transmitted the query request message to that further computing device, and wherein that additional computing device then transmits the query response message to the first computing device.

5. A computer readable storage medium having computer executable instructions stored thereon for automating communications between two or more computing devices, comprising instructions for:

sending a request message from a first computing device to one or more additional computing devices comprising a first level of peers, said request message representing a request for particular information, and wherein said request message further includes a forwarding recursion level, said forwarding recursion level providing a maximum number of peer levels to which the request message may be forwarded if that request message is unanswerable by any computing device receiving the request message;

on any additional computing device that receives the request message:

determining whether the received request message is authorized;

if the request message is authorized, evaluating the request message to determine whether the particular information requested is accessible to the additional computing device, if the particular information requested is accessible to the additional computing device, transmitting a response message that includes the particular information requested to the first computing device, if the particular information requested is not accessible to the additional computing device, forwarding the request message to one or more further computing devices comprising a subsequent peer level, and wherein further computing devices in subsequent peer levels will continue to forward the request message to one or more further computing devices comprising further subsequent peer levels when the information requested by the request message is not locally accessible until such time as the recursion level representing the maximum number of peer levels has been reached;

using one or more of the additional computing devices to send at least one reply information request to any of the first computing device and the other additional computing devices in response to the request message; and wherein any of the first computing device and the other additional computing devices receiving one or more reply information requests responds to the reply information requests by transmitting any corresponding locally accessible information to the computing device that sent the reply information request.

6. The computer readable storage medium of claim 5 wherein determining whether the received request message is authorized further comprises instructions for determining whether the request message has been transmitted via an authorized device.

7. The computer readable storage medium of claim 5 wherein determining whether the received request message is authorized further comprises instructions for determining whether the request message has been transmitted from an authorized user.

8. The computer readable storage medium of claim 5 wherein determining whether the received request message is authorized further comprises instructions for determining whether the requested particular information is authorized to be transmitted to the first computing device.

9. A method for facilitating automated communications between two or more electronic devices, comprising:

using a first computing device to send at least one original information request to one or more additional computing devices comprising a first level of peers, and wherein each original information request further includes a forwarding recursion level, said forwarding recursion level providing a maximum number of peer levels to which any original information request may be forwarded if that original information message is unanswerable by any computing device receiving the information request;

for each additional computing device receiving one or more original information requests, determining whether each original information request is authorized;

for each additional computing device having an authorized original information request, determining whether the requested information corresponding to each authorized original information request is locally accessible;

if the requested information is locally not locally accessible forwarding the original information request to one or more further computing devices comprising a subsequent peer level;

wherein further computing devices in subsequent peer levels will continue to forward the original information request to one or more further computing devices comprising further subsequent peer levels when the information requested by the original information request is not locally accessible until such time as the recursion level representing the maximum number of peer levels has been reached;

if the requested information is locally accessible on any additional computing device, transmitting that information from the additional computing device to the first computing device;

using one or more of the additional computing devices to send at least one reply information request to any of the first computing device and the other additional computing devices in response to one or more of the original information requests; and wherein any of the first computing device and the other additional computing devices receiving one or more reply information requests responds to the reply information requests by transmitting any corresponding locally accessible information to the computing device that sent the reply information request.

10. The method of claim 9 wherein the automated communications enables automated scheduling of appointments between two or users associated with any of the first computing device and the additional computing devices.

11. The method of claim 9 wherein the automated communications enables any of the first computing device and the additional computing devices to automatically report current user location information for users associated with those computing devices.

12. The method of claim 9 wherein the requested information includes at least one of:

user contact information;

user location information schedule information; and status information.

* * * * *